United States Patent
Posey

(10) Patent No.: US 9,658,083 B1
(45) Date of Patent: May 23, 2017

(54) AXIAL MAGNETIC SENSOR

(71) Applicant: Hermetic Switch, Inc., Chickasha, OK (US)

(72) Inventor: David Tyler Posey, Blanchard, OK (US)

(73) Assignee: Hermetic Switch, Inc., Chickasha, OK (US)

( * ) Notice: Subject to any disclaimer, the term of this patent is extended or adjusted under 35 U.S.C. 154(b) by 105 days.

(21) Appl. No.: 14/818,938

(22) Filed: Aug. 5, 2015

Related U.S. Application Data

(60) Provisional application No. 62/033,188, filed on Aug. 5, 2014.

(51) Int. Cl.
*G01B 7/30* (2006.01)
*G01D 5/14* (2006.01)
*G01B 7/02* (2006.01)

(52) U.S. Cl.
CPC ............ *G01D 5/142* (2013.01); *G01B 7/023* (2013.01)

(58) Field of Classification Search
CPC ...... H01F 7/066; H01F 7/0242; H01F 7/0284; H01F 7/00; H01F 7/02; H01F 7/04; H01F 13/003; H01F 1/04; H02P 6/00; H02P 6/16; G01P 3/487; G01P 3/488; H01J 23/10; H01J 2229/5682; G01B 7/30; G01R 33/0005; G01R 33/091; G01R 11/14; G01R 33/038; G01V 3/08
See application file for complete search history.

(56) References Cited

U.S. PATENT DOCUMENTS

| | | |
|---|---|---|
| 3,205,323 A | 9/1965 | Deshautreaux |
| 3,560,846 A | 2/1971 | Bessko |
| 4,210,888 A | 7/1980 | Holce |
| 5,128,641 A | 7/1992 | Posey |
| 5,233,322 A | 8/1993 | Posey |
| 5,293,523 A | 3/1994 | Posey |
| 5,602,472 A * | 2/1997 | Bergstedt ............... G01P 3/487 188/181 R |
| 5,742,160 A * | 4/1998 | Bergstedt ............... G01P 3/487 324/162 |
| 6,313,724 B1 | 11/2001 | Osterweil |
| 8,024,956 B2 * | 9/2011 | Hammerschmidt ... G01D 5/145 73/1.11 |

OTHER PUBLICATIONS

Go Switch, 2013, 20, TOPWORX, http://www2.emersonprocess.com/siteadmincenter/PM%20TopWorx%20Documents/ES-01259-1%20R4%20GO%20Brochure.pdf.

* cited by examiner

*Primary Examiner* — Vinh Nguyen
(74) *Attorney, Agent, or Firm* — McAfee & Taft, A Professional Corporation

(57) ABSTRACT

An end-sensing sensor assembly for proximity sensing including one or more sensing devices positioned between two axially magnetized ring magnets having like poles facing one another such that the magnetic fields emanating from the two axially magnetized ring magnets define a moveable balanced zone therebetween. The one or more sensing devices may be positioned within the balanced zone or outside the balanced zone, or combinations thereof. The balanced zone shifts in response to the approach of a magnetic, permeable, and/or ferrous material which cause the sensing device to actuate in response to a sufficient shift in the balanced zone. Upon removal or departure of the magnetic, permeable, and/or ferrous material, the balance zone shifts back to the initial position prior to the approach of the magnetic, permeable, and/or ferrous material.

20 Claims, 17 Drawing Sheets

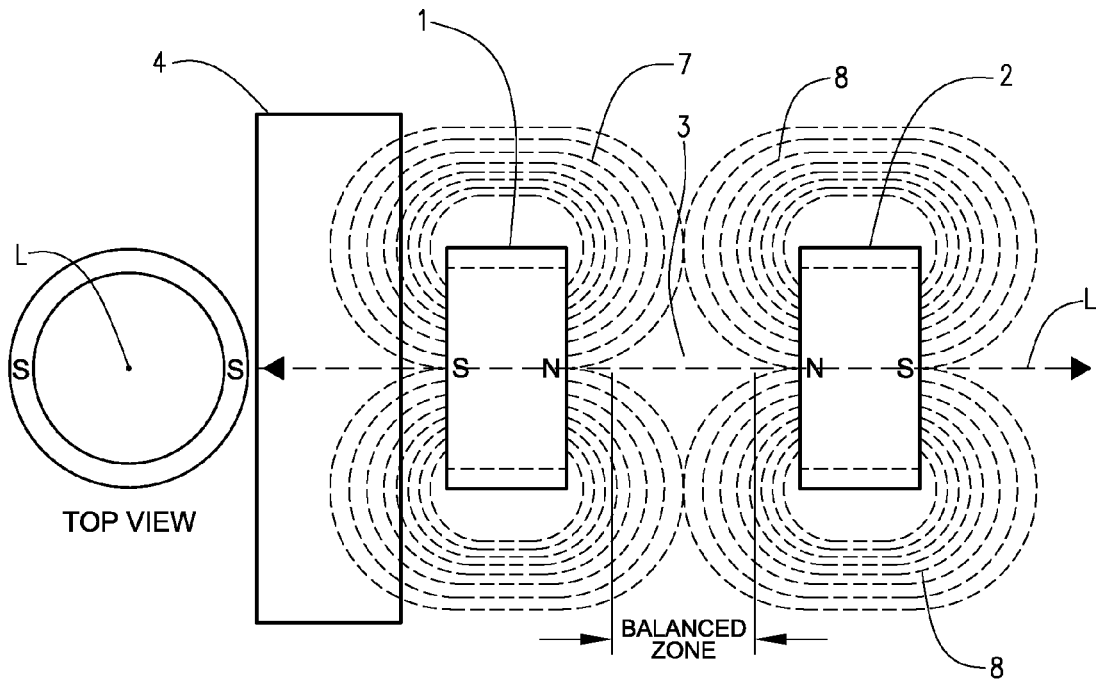
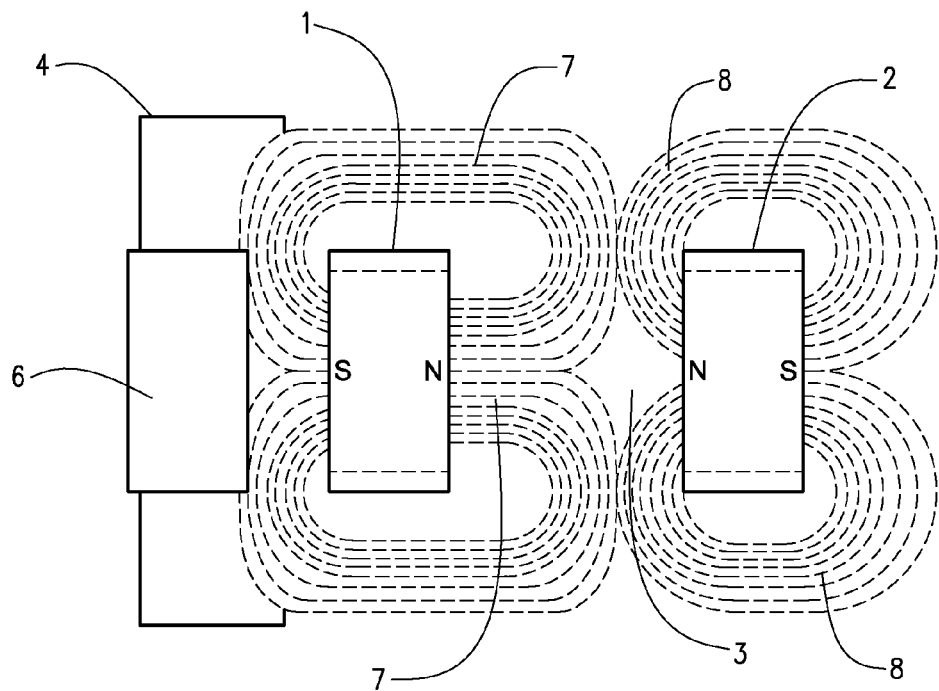

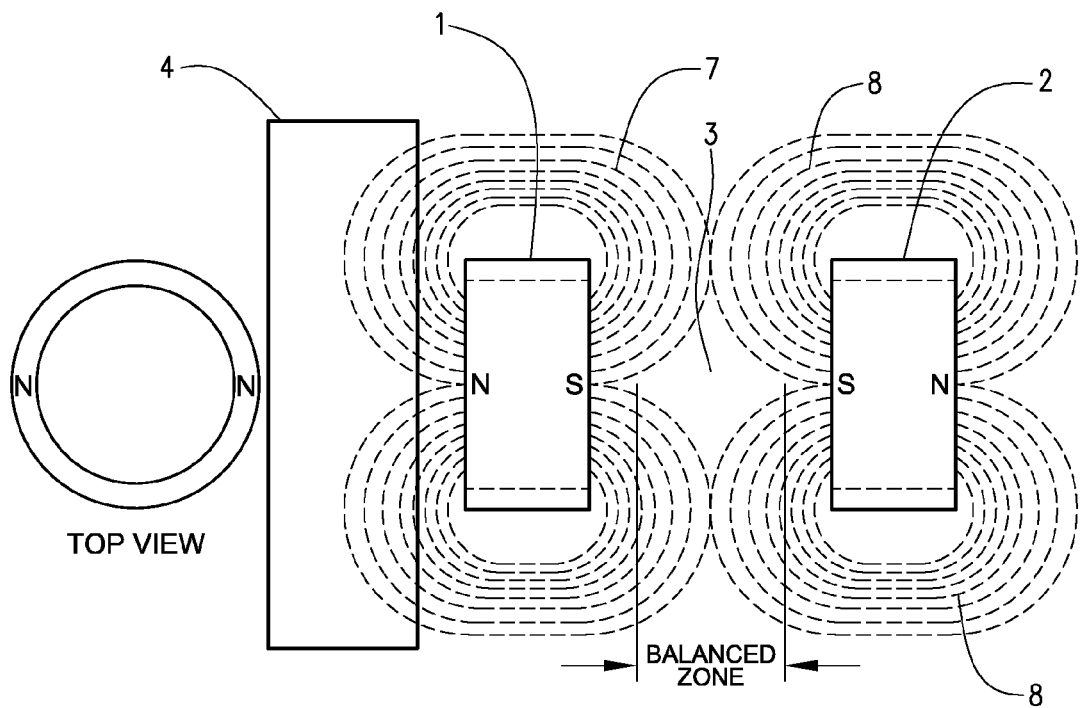
FIG. 3A
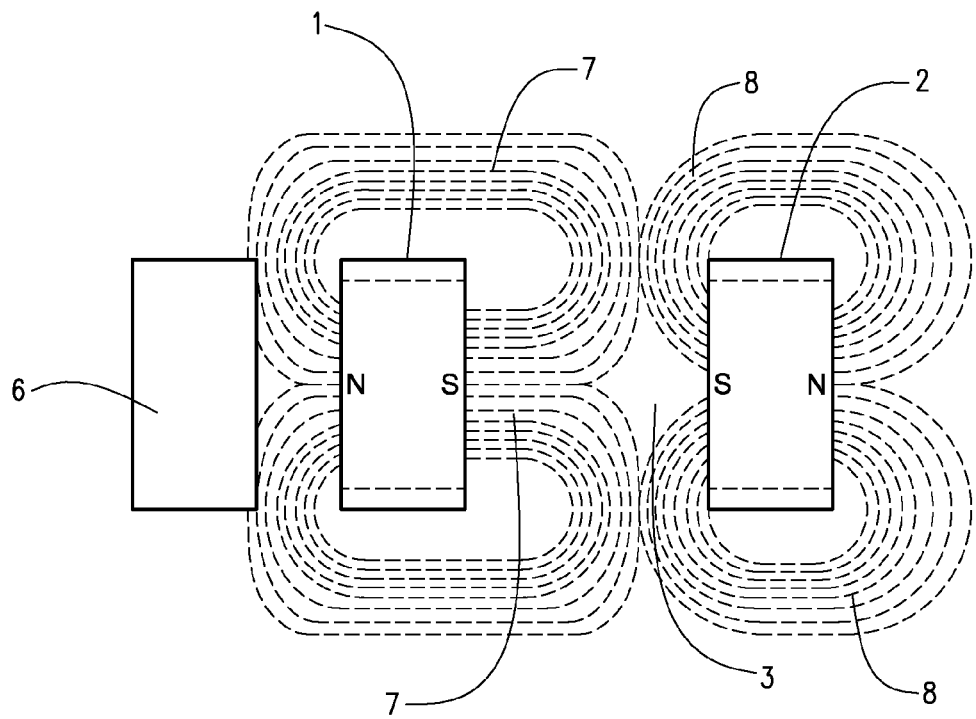
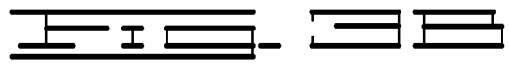
FIG. 3B

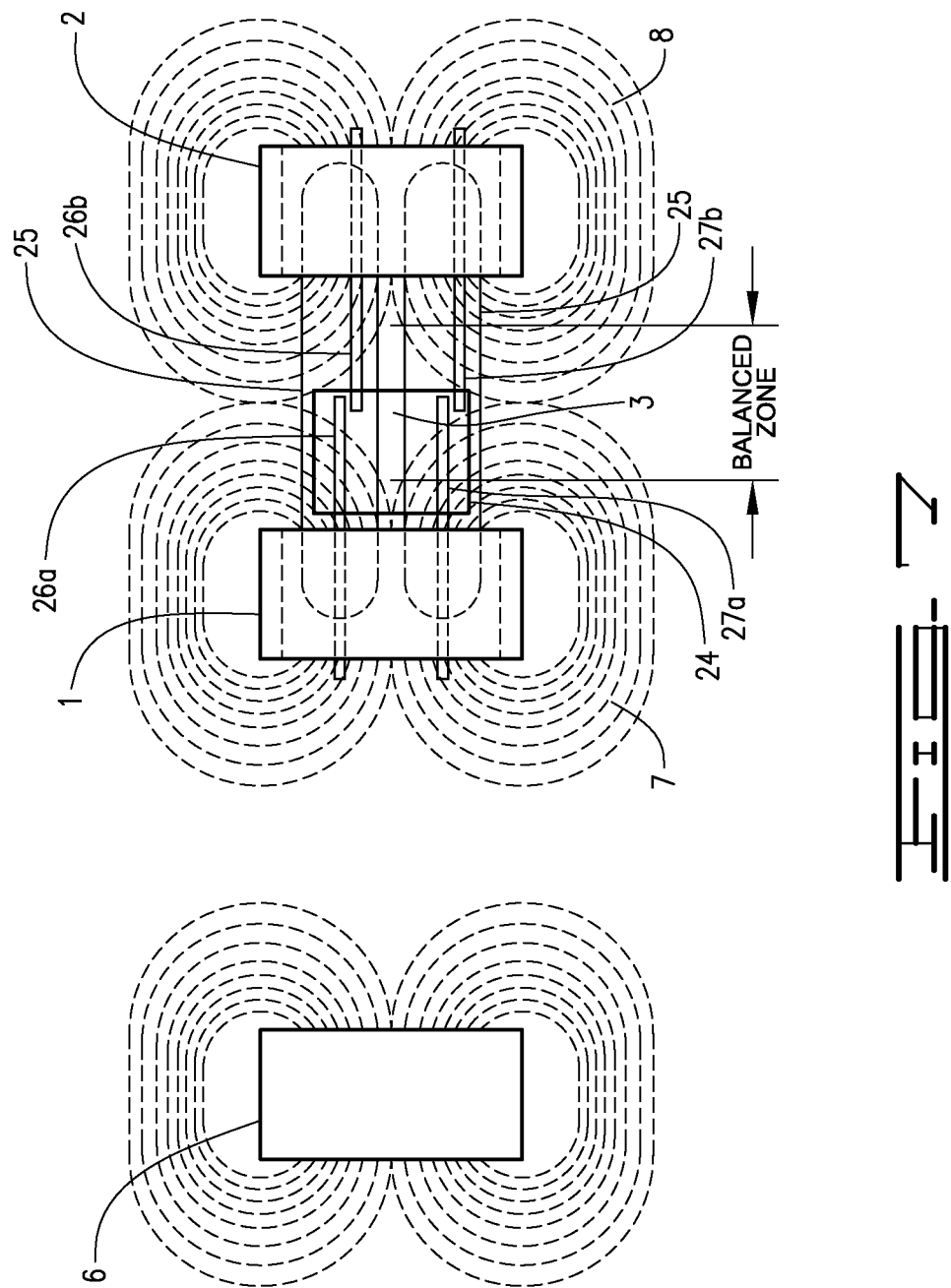

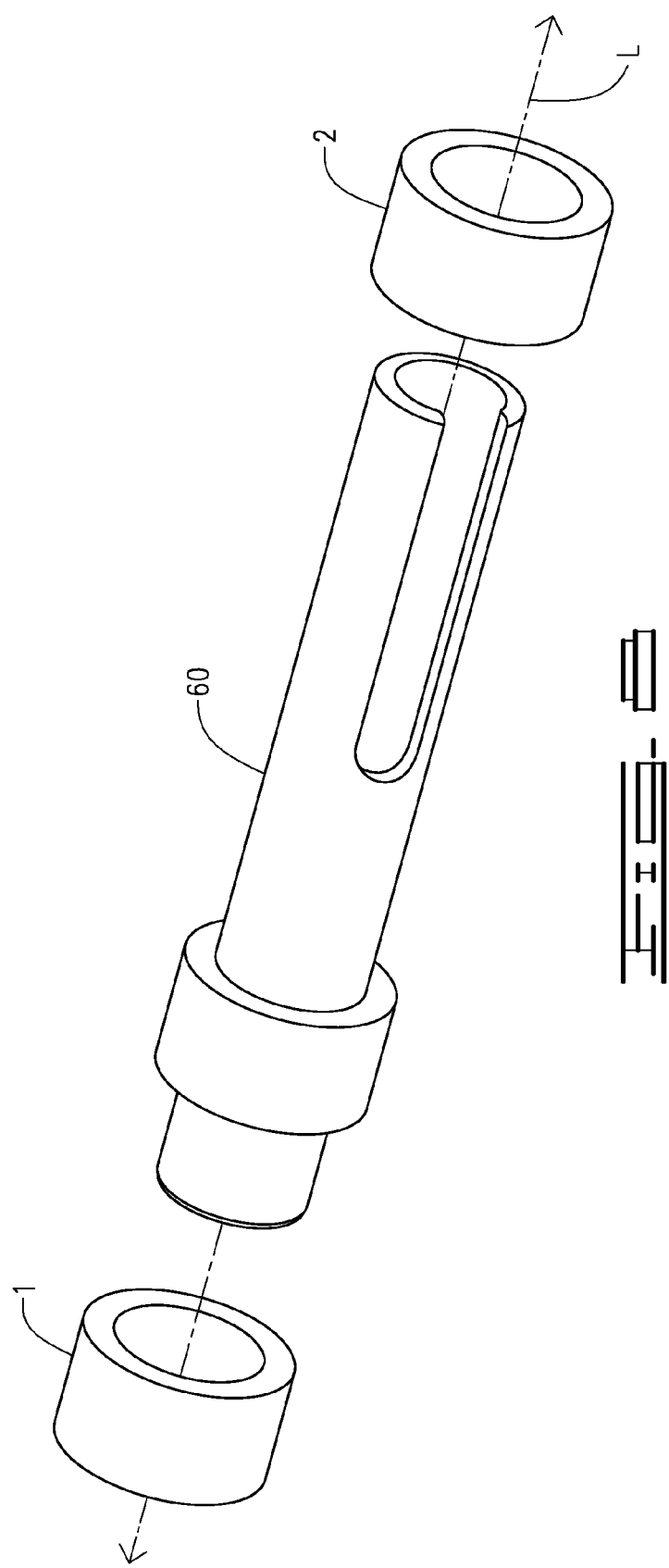

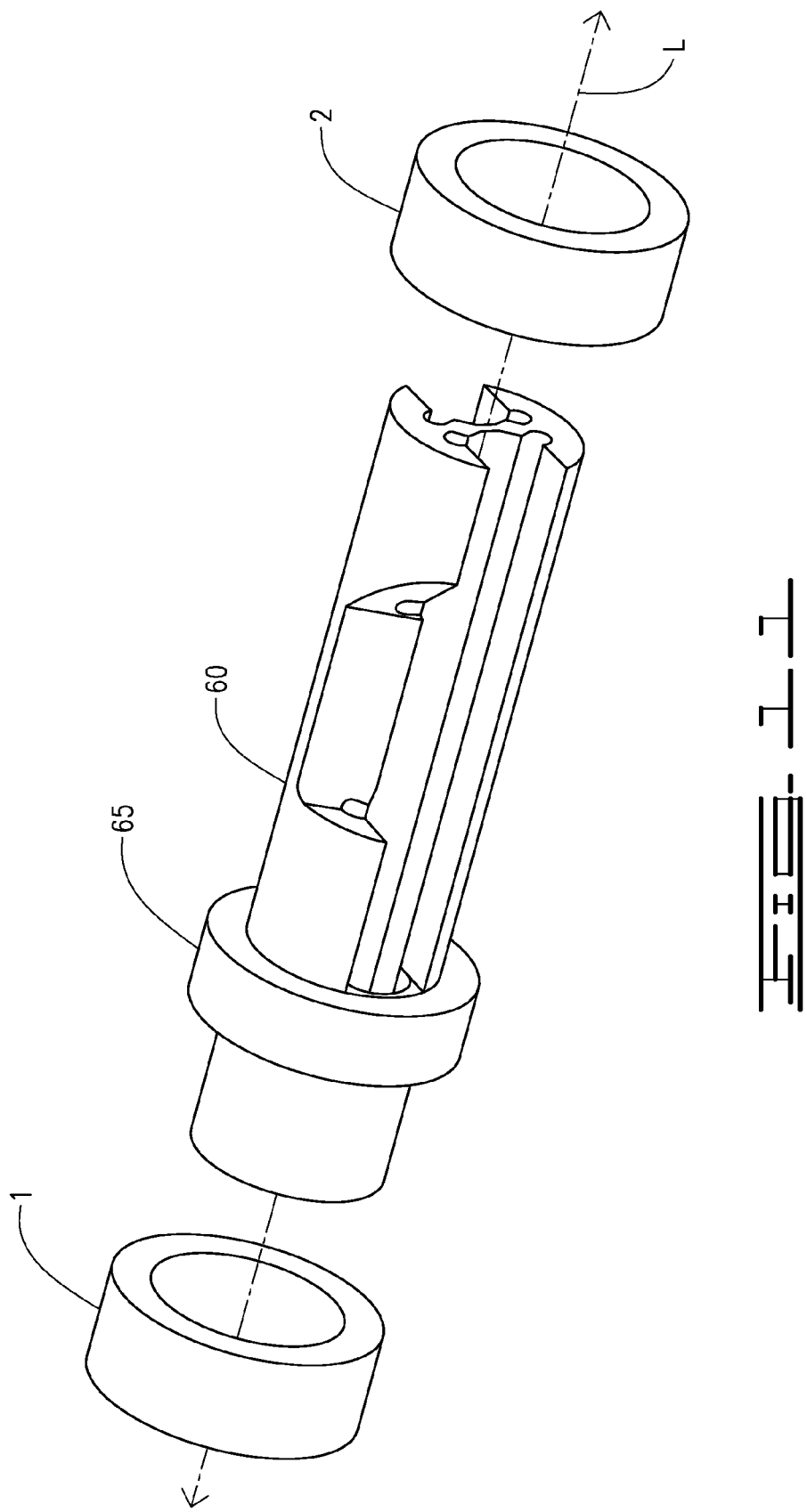

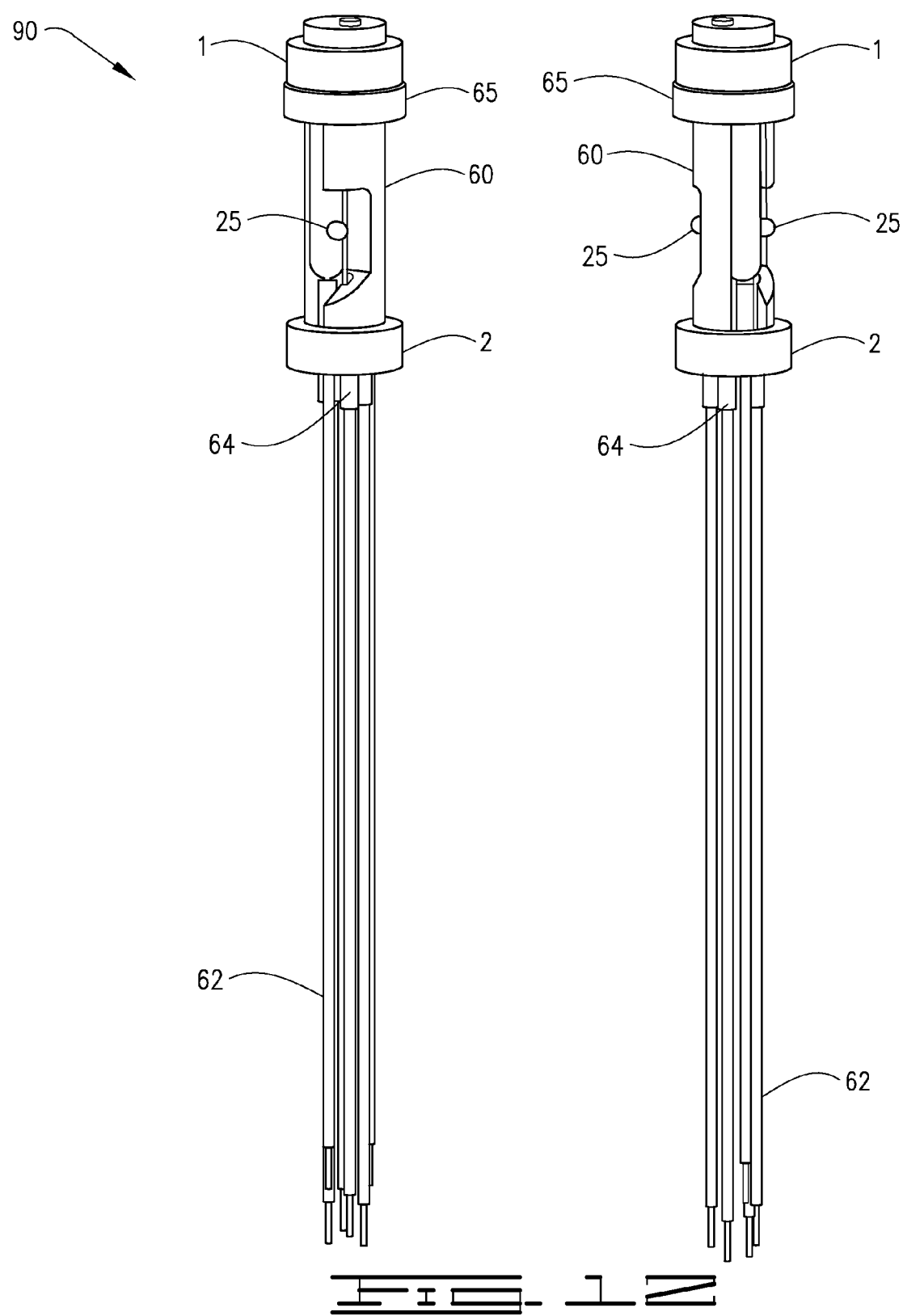

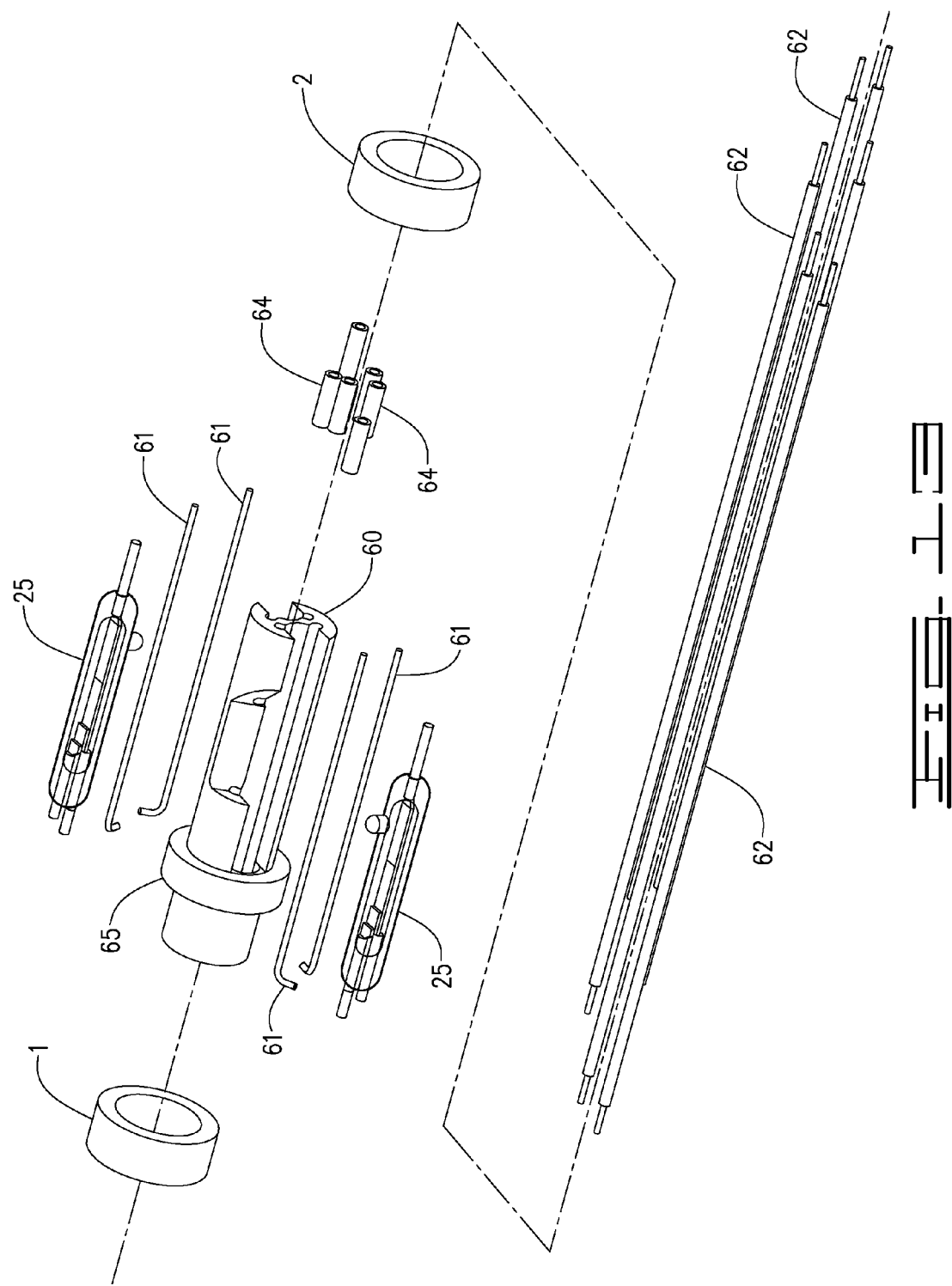

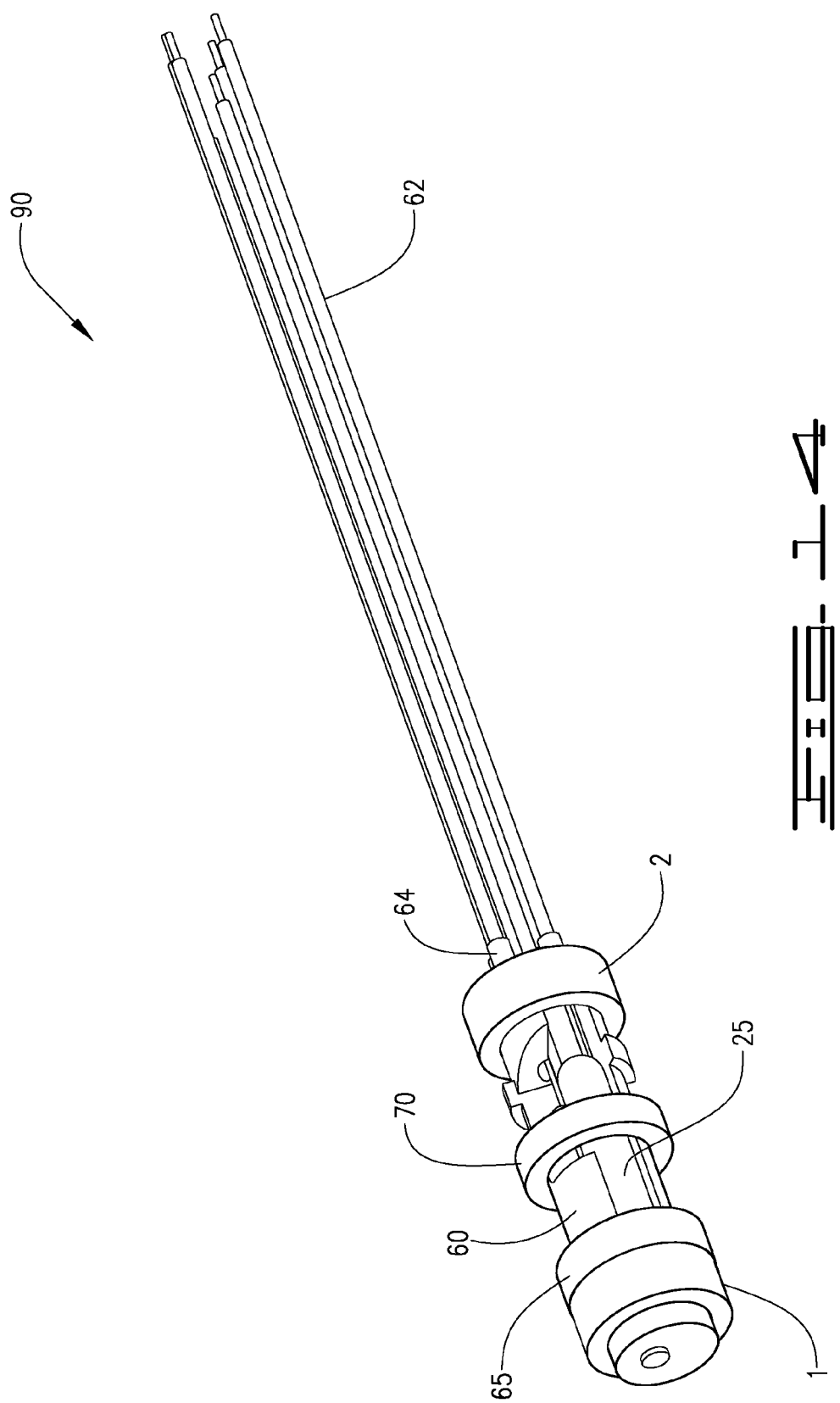

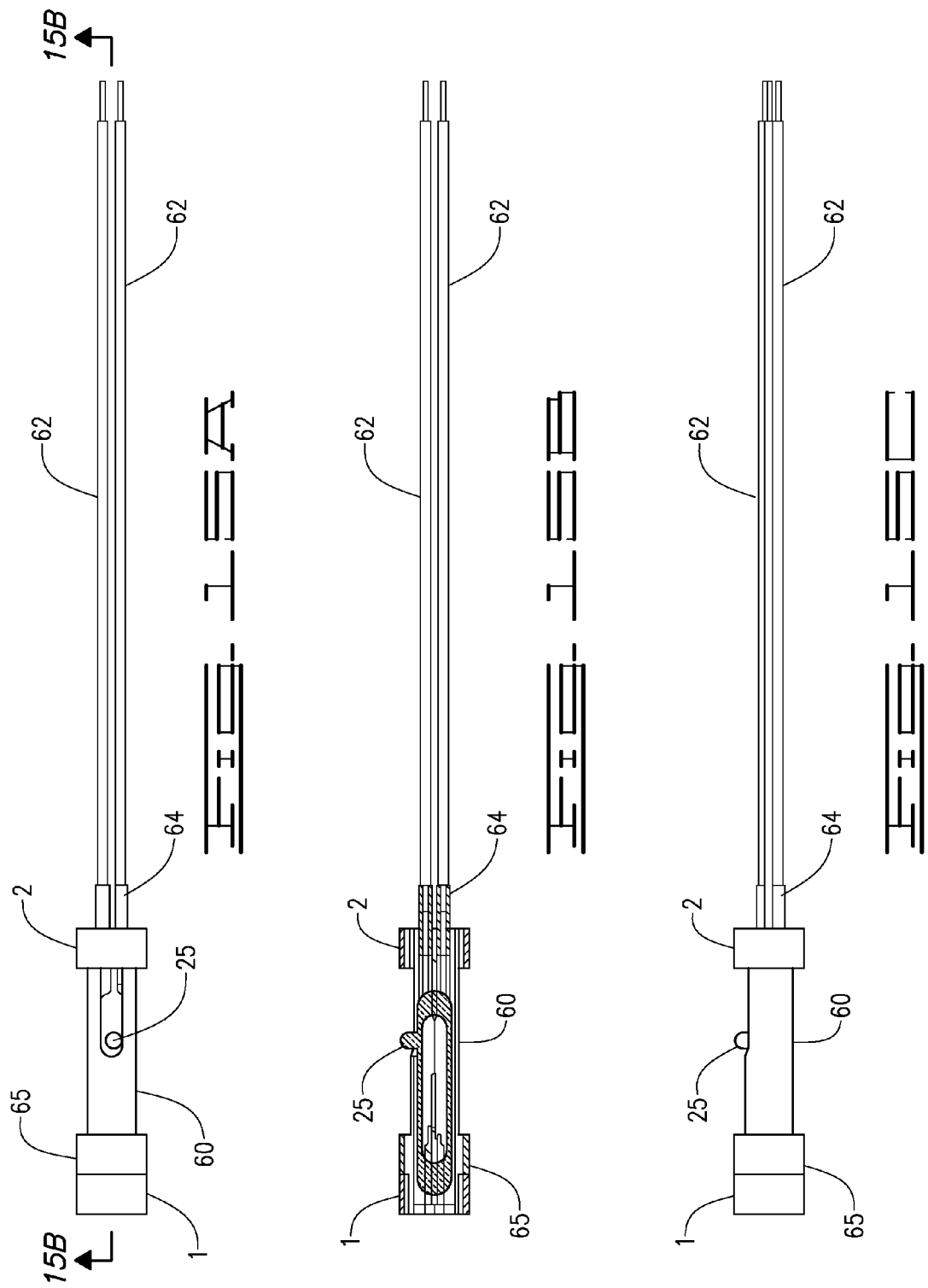

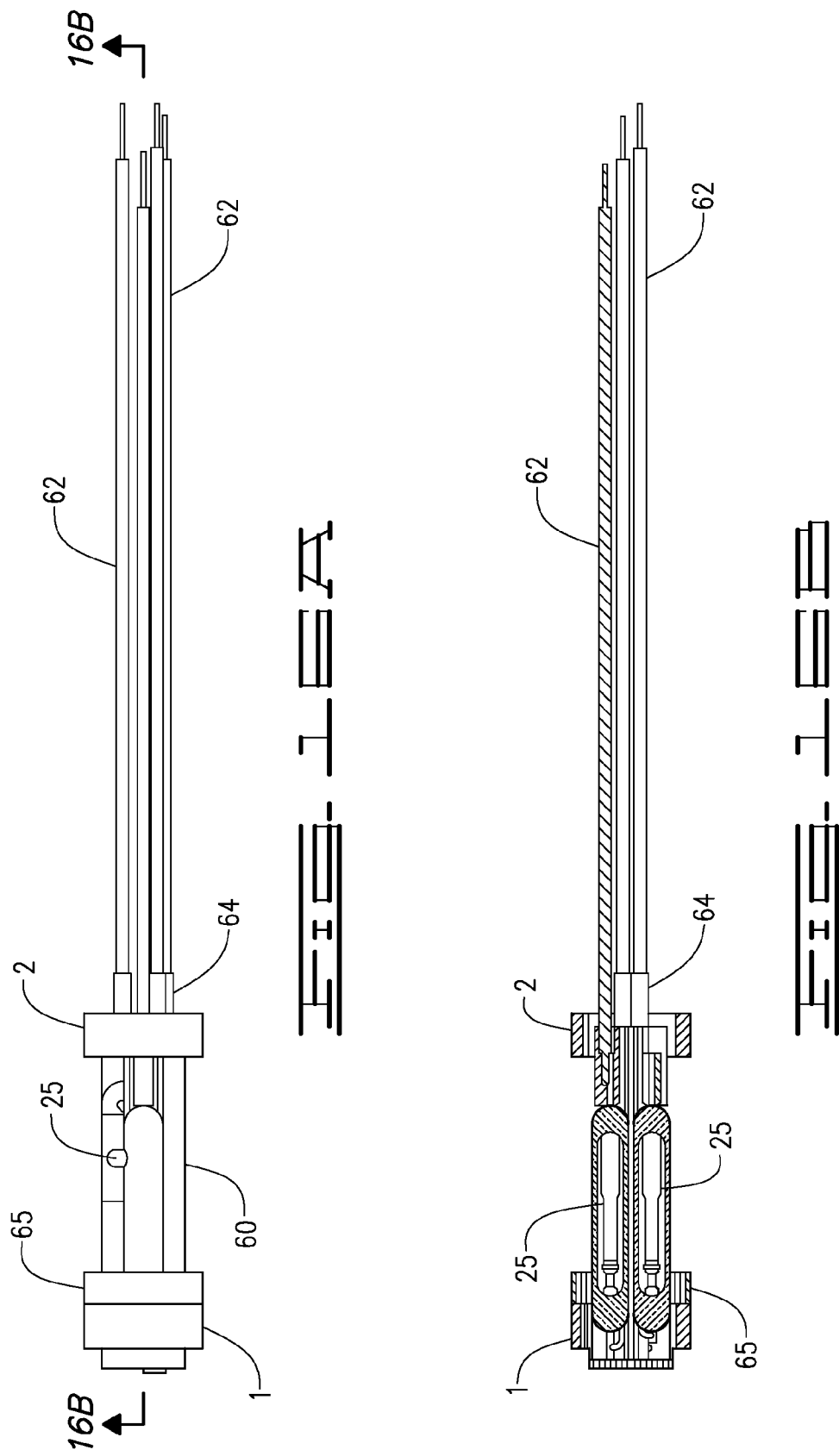

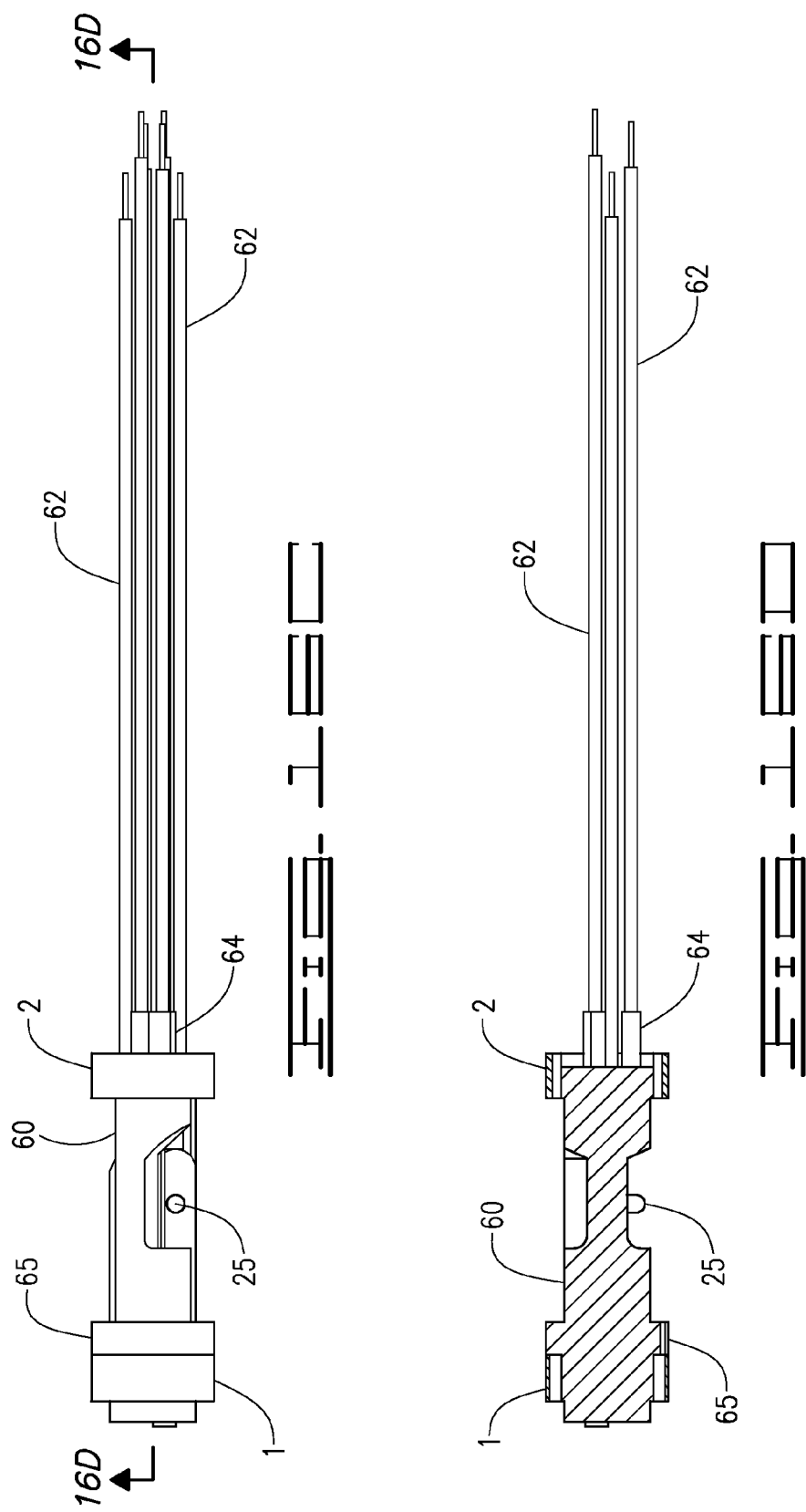

AXIAL MAGNETIC SENSOR

CROSS-REFERENCE TO RELATED APPLICATIONS

This application claims priority from U.S. Provisional Patent Application Ser. No. 62/033,188, filed Aug. 5, 2014, the entire contents of which are incorporated herein by reference.

BACKGROUND

This disclosure generally relates to magnetically actuated sensor technology for proximity sensing, including sensing technology that is actuatable in response to the approach and withdrawal of a ferrous, permeable, and/or magnetic material.

SUMMARY

A sensor assembly comprising a non-magnetic insert having a first end, a second end, and a longitudinal axis. The sensor assembly also includes a sensing magnet, the sensing magnet is an axially-magnetized ring magnet, and is carried by the first end of the non-magnetic insert. The sensor assembly further includes an internal magnet, the internal magnet is an axially-magnetized ring magnet spaced apart from and coaxial with the sensing magnet. The internal magnet is carried by the second end of the non-magnetic insert. The sensing magnet and internal magnet are in a repulsive configuration such that the magnets are oriented to each other with like-poles facing one another. A moveable balanced zone is between the magnets and defined by magnetic fields emanating from each of the sensing magnet and the internal magnet. The moveable balanced zone is positioned between the two magnets where the magnetic fields of each magnet are in balance with each other. The balanced zone shifts in response to the proximity of a target. The sensor assembly further includes a sensing device in a first state, the sensing device is positioned between the sensing magnet and the internal magnet. The sensing device is configured to transition from the first state to a second state upon detection of a disturbance to the balanced zone, wherein such disturbance causes the balanced zone to shift a sufficient amount to be detectable by the sensing device. For example, the sensor assembly may include one or more sensing devices. Each sensing device may be positioned in the balanced zone, outside the balanced zone, or combinations thereof.

Another example of the sensor assembly includes two axially-magnetized ring magnets, a non-magnetic insert having a longitudinal axis, and a sensing device. The non-magnetic insert is positioned between the two axially-magnetized ring magnets, and the axially-magnetized ring magnets are coaxial and oriented with like poles facing one another such that resulting magnetic flux lines emanating from the two axially-magnetized ring magnets define a moveable balanced zone therebetween. The balanced zone shifts in response to the proximity of a target. The sensing device in a first state is carried within the non-magnetic insert, and is configured to transition from the first state to a second state upon detection of a disturbance to the balanced zone, wherein such disturbance causes the balanced zone to shift a sufficient amount to be detectable by the sensing device.

Another example of a sensor assembly includes a non-magnetic insert having a longitudinal axis, where the non-magnetic insert is positioned between two axially-magnetized ring magnets. The two magnets are coaxial and oriented with each other with like poles facing one another such that the magnetic flux emanating from each of the magnets define a moveable balanced zone therebetween. The moveable balanced zone is defined such that each magnet does not exert a force on the other magnet and the balanced zone shifts in response to the proximity of a target, wherein the target includes a magnetic, permeable, and/or ferrous material. The sensor assembly also includes a magnetic sensing device configured to detect a change in a flux, upon the approach or departure of the target near the longitudinal axis and an exterior surface of one of the axially-magnetized ring magnets which disturbs the balanced zone by causing the balanced zone to shift. The magnetic sensing device is positioned between the axially-magnetized magnets and is carried by the non-magnetic insert.

BRIEF DESCRIPTION OF THE DRAWINGS

FIG. 2A depicts the relative position of two magnets in a repulsion configuration with like north poles facing each other.

FIG. 2B illustrates the influence a target has on the magnet configuration of FIG. 2A.

FIG. 3A depicts the relative position of two magnets in a repulsion configuration with like south poles facing each other.

FIG. 3B illustrates the influence a target has on the magnet configuration of FIG. 3A.

FIGS. 4A-7 depict various embodiments of the sensor assembly and the effect of a target on the sensor assembly.

FIG. 8 is an exploded perspective view of one embodiment of a portion of a sensor assembly.

FIG. 11 is an exploded perspective view of another embodiment of a portion of a sensor assembly.

FIG. 12 is a drawing of an assembled sensor assembly of the portion depicted in FIG. 11.

FIG. 13 is an exploded perspective view of the sensor assembly shown in FIG. 12.

FIG. 14 depicts another embodiment of the sensor assembly.

FIGS. 15A-16D depict various views and cross-sections of various embodiments of the sensor assembly.

DETAILED DESCRIPTION

Figure 1:
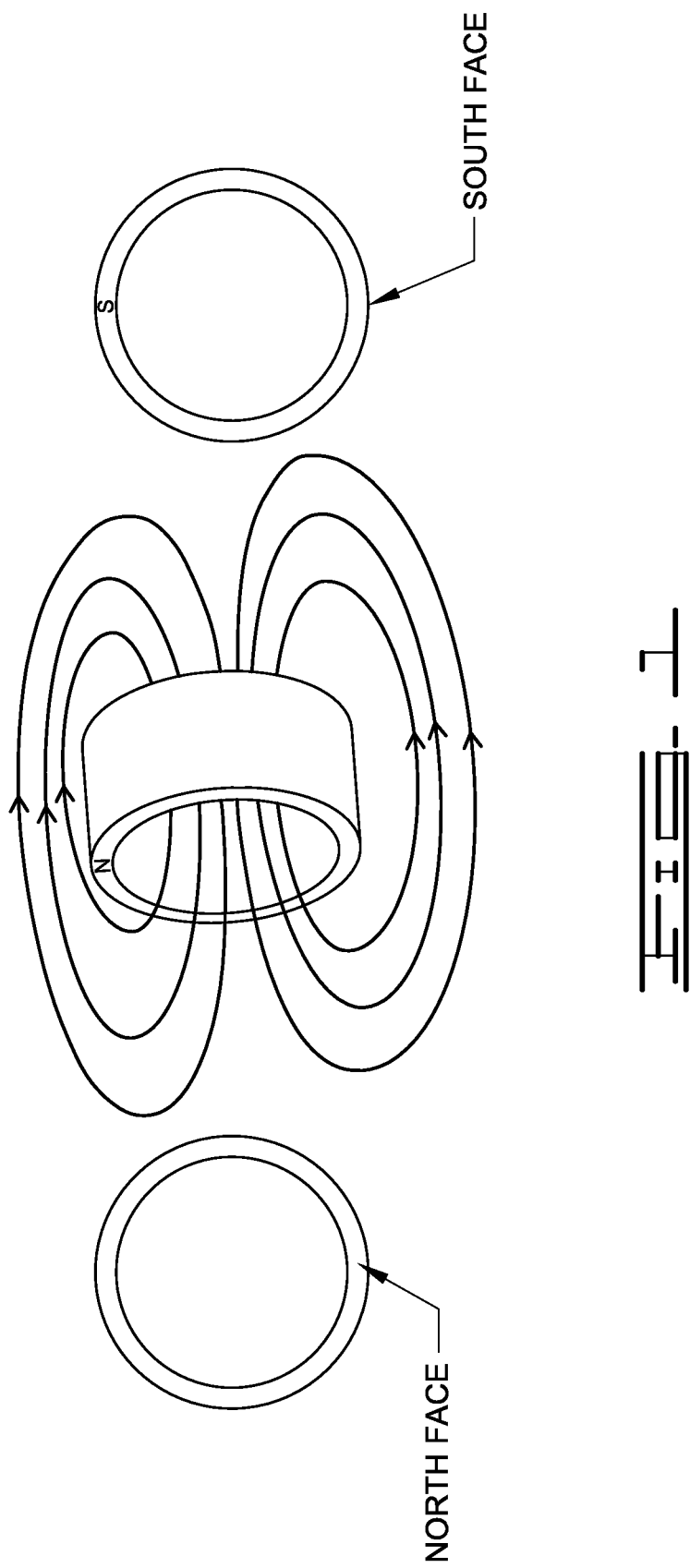
FIG. 1 illustrates a representative ring magnet and its axial magnetic orientation.

Sensor assembly 90 is configured for axial orientation such that a magnetic field is emitted out of the end of the sensor assembly and provides for end-sensing detection. Sensor assembly 90 may be any suitable shape, including cylindrically shaped or a rectangular box. Sensor assembly 90 does not contain any moving internal magnets. Further, sensor assembly 90 is less susceptible to vibration and effects of gravity due to the mass of the magnet. The use of sensing devices 25, including reed switches, Hall sensors, or other electronic gauss measuring devices help improve shock and vibration resistance of the sensor assembly that current proximity sensors exhibit susceptibility. Sensor assembly may include one or more sensing devices for independent or redundant signals.

For example, when two magnets are used as described herein, sensing magnet 1 (also referred to as first magnet 1) and internal magnet 2 (also referred to as second magnet 2) can be substantially similar in one or more properties, for example, magnetic properties, magnetic strength, composition, size, and shape; or magnets 1 and 2 can be different in one or more properties, for example, magnetic properties, magnetic strength, composition, size, and shape depending on the application or environment for which sensor assembly 90 will be employed.

The magnets may be axially magnetized or have any magnetized orientation so long as a magnetic field is emitted out the end of sensor assembly 90 and sensor assembly is capable of end-sensing detection. Suitable magnets for sensing magnet 1 and internal magnet 2 include ring magnets, including cylindrical ring magnets, disc magnets, electromagnets, ceramic magnets, neodymium material, samarium cobalt, or any material or magnet capable of producing a balanced zone and achieving the described functionality as shown in the figures and described herein.

Magnets are sensitive to temperature, most magnets gain magnetic strength when cooled and lose strength when heated. For example, when sensor assembly 90 includes two ring magnets positioned in a repulsive configuration with like-poles facing one another, a moveable balanced zone or balanced magnetic field is created between the magnets by the flux emanating from each magnet. The magnets will be affected by environmental factors similarly, e.g. similar thermal reactivity. Accordingly, sensor assembly 90 and its sensing distance is less susceptible to change as temperature changes compared to proximity sensors using a single magnet.

For example, in applications where one magnet of sensor assembly 90 will be at a different temperature than the other magnet or experience different environmental factors than the other (e.g. vibration), additional components can be added, or first magnet 1 and second magnet 2 can be different and each having different properties than the other in order to account for the environment such that a balanced zone 3 as described herein is obtained and the sensor assembly functions as described herein.

As should be appreciated by the present disclosure, sensor assembly 90 is scalable in size for the application in which it will be used, the type, properties, size, number, and sensitivity of the sensing devices 25, first magnet 1, and second magnet 2 can be adjusted for the specific application.

FIG. 1 illustrates a ring magnet and its relative magnetization polarity. For example, the ring magnet in FIG. 1 is axially magnetized with the north polarity indicated by the north-labeled face and the south polarity indicated by the south-labeled face. The magnetic field lines are shown emanating from the north face to the south face and through the ring magnet.

Sensor assembly 90 includes a sensing magnet 1, an internal magnet 2, a non-magnetic insert 60 having a first end, a second end, and a longitudinal axis L, and one or more sensing devices 25. For example, sensing magnet 1 and internal magnet 2 are each axially-magnetized ring magnets. Sensing magnet 1 and internal magnet 2 are coaxial and oriented with each other in a repulsive configuration with like poles facing one another. Sensor assembly 90 is configured for end-sensing detection of a target. Sensing magnet 1 is the magnet that will be closest to the approach and withdrawal of a target and internal magnet 2 is the magnet in sensor assembly 90 that is distal from or further away from the target compared to sensing magnet 1.

As will be further described, a moveable balanced zone 3 is positioned between the sensing magnet 1 and internal magnet 2. The movable balanced zone 3 is defined by the magnetic fields emanating from each magnet where the magnetic fields of each magnet are in balance with each other. The moveable balanced zone 3 is configured to shift in response to the proximity of a target. The one or more sensing devices 25 are in a first state and are positioned between sensing magnet 1 and internal magnet 2. Sensing device 25 is configured to transition from the first state to a second state upon detection of a disturbance to balanced zone 3, wherein such disturbance causes balanced zone 3 to shift a sufficient amount to be detectable by sensing device 25.

For ease of discussion with reference to the figures, sensor assembly 90 will be discussed using ring magnets for sensing magnet 1 and internal magnet 2 and a reed switch for sensing device 25. It should be appreciated that other types of magnets and magnetic sensing devices may be used and any reference to a particular type of element is for illustrative purposes only.

FIGS. 2-7 illustrate various configurations the two magnet configuration in sensor assembly 90 and the effect of a target on sensor assembly 90. For simplicity, other components of sensor assembly 90 are omitted from these figures.

FIG. 2A illustrates the relative positioning of the two magnet configuration in sensor assembly 90. With reference to FIG. 2A, sensing magnet 1 and internal magnet 2 are positioned a repulsive configuration and oriented with the same polarity facing each other. As shown in FIG. 2A, sensing magnet 1 and internal magnet 2 are coaxial with each other on longitudinal axis L. For example, as shown in FIG. 2A, each magnet's north face is facing the other magnet. As shown in FIG. 2A, the magnetic flux lines emanating from each magnet define a moveable balanced zone 3 between sensing magnet 1 and internal magnet 2. A top view of the configuration is also shown in FIG. 2A. FIG. 3A is similar to FIG. 2A except that FIG. 3A shows magnets 1 and 2 oriented such that each magnet's south pole faces the other magnet.

As depicted in FIGS. 2A and 3A, sensing magnet 1 defines a sensing area 4. Sensing area 4 is centered around longitudinal axis L and extends away from sensing magnet 1 and internal magnet 2. As will be further described, the approach or departure of target 6 in sensing area 4 will disturb balanced zone 3 by causing balanced zone 3 to shift.

Sensing area 4 is depicted in the figures as a box; however, it should be appreciated that the box depicting sensing area 4 is for illustrative purposes only. Sensing area 4 should not be construed as limited to a rectangular shape or of any specific geometric shape. Sensing area 4 may vary in size depending on the iron content of the component approaching sensor assembly 90.

For example, for ferrous targets having approximately 50% iron content, sensing area 4 will be in a zone or distance from sensing magnet 1 equal to the length of sensing magnet 1, i.e. the distance between the pole faces of sensing magnet 1. A non-limiting example includes, a sensor assembly having a 0.250 inches long ring magnet for sensing magnet 1 will activate the sensing device within the assembly when the target is about 0.250 inches away. For example, the width of sensing area 4, in the case of ring shaped magnets, will be at the edges of the outside diameter of sensing magnet 1.

With reference to FIGS. 2A and 3A, magnetic flux lines 7 of sensing magnet 1 and magnetic flux lines 8 of internal magnet 2 effectively have a similar output to create a moveable balanced zone 3. As shown, balanced zone 3 may be centered at the center point between magnets 1 and 2. Balanced zone 3 is not limited to be centered at the center point between magnets 1 and 2 as balanced zone 3 is the area where the magnetic fields of each magnet are in balance as neither sensing magnet 1 or internal magnet 2 exert a force on the other. Accordingly, the center of balanced zone 3 may be elsewhere between magnets 1 and 2. As shown, balanced zone 3 is defined where the magnetic fields emanating from each magnet diverge from each other due to the repulsive configuration of the magnets with each other.

By way of illustration only, magnets 1 and 2 can be thought of as water hoses and flux lines 7 and 8, respectively, can be water emanating from the water hoses. As the water approaches from opposite directions, the point at which the two water spouts meet is diverted outward in a circular direction. This outward flow of water, or magnetism in the device, is ineffective in activating sensing device because the flow is in the wrong direction. When one flow is stronger, as caused by the approach of target 6 on one of the magnets, the flow through sensing device causes sensing device to go active.

FIGS. 2B and 3B illustrate balanced zone 3 shifting in response to the proximity of target 6 into sensing area 4. Target 6 includes a magnetic, permeable, and/or ferrous material therein which is capable of causing the disturbance to balanced zone 3 upon the approach or withdrawal of target 6 to sensor assembly 90. As illustrated in FIGS. 2B and 3B, the proximity of target 6 affects magnetic flux line 7 of sensing magnet 1 by causing a disturbance to balanced zone 3. As shown in FIGS. 2B and 3B magnetic flux lines 7 are shifted and intensified internally with respect to internal magnet 2. Comparing FIGS. 2B and 3B to FIGS. 2A and 3A, magnetic flux lines 7 effectively push against magnetic flux lines 8 of internal magnet 2 and, as a result, balanced zone 3 is displaced or shifted closer to internal magnet 2. Internal magnet 2 is not directly affected by target 6 like sensing magnet 1 is. With reference back to the water hose analogy, the pressure of water emanating from hose 1 (magnet 1) is increased such that it pushes against the water emanating from hose 2 (magnet 2), whose pressure remains unchanged; as a result, the two water streams (flux lines 7 and 8) meet nearer to hose 2.

Withdrawal of or removal of target 6 beyond sensing area 4 results in a rebalancing or shifting of balanced zone 3 back to the original position as depicted in FIGS. 2A and 3A.

FIGS. 4A-7 are illustrative of the concepts and functions described with respect to FIGS. 2-3 with the exception that FIGS. 4A-7 contain a sensing device 25 positioned between sensing magnet 1 and internal magnet 2. As shown in FIGS. 4A-7, sensing magnet 1 and internal magnet 2 are arranged in a repulsive configuration with like poles facing one another.

Sensing device 25 is positioned within balanced zone 3 such that the reactive elements of the reed switch are within balanced zone 3. Because of the perpendicularity of flux lines 7 and 8, reed elements 26a and 26b are not attracted to each other, thusly the reed switch is inactive, i.e. the contacts are open as shown in FIG. 4A.

Figure 4A:
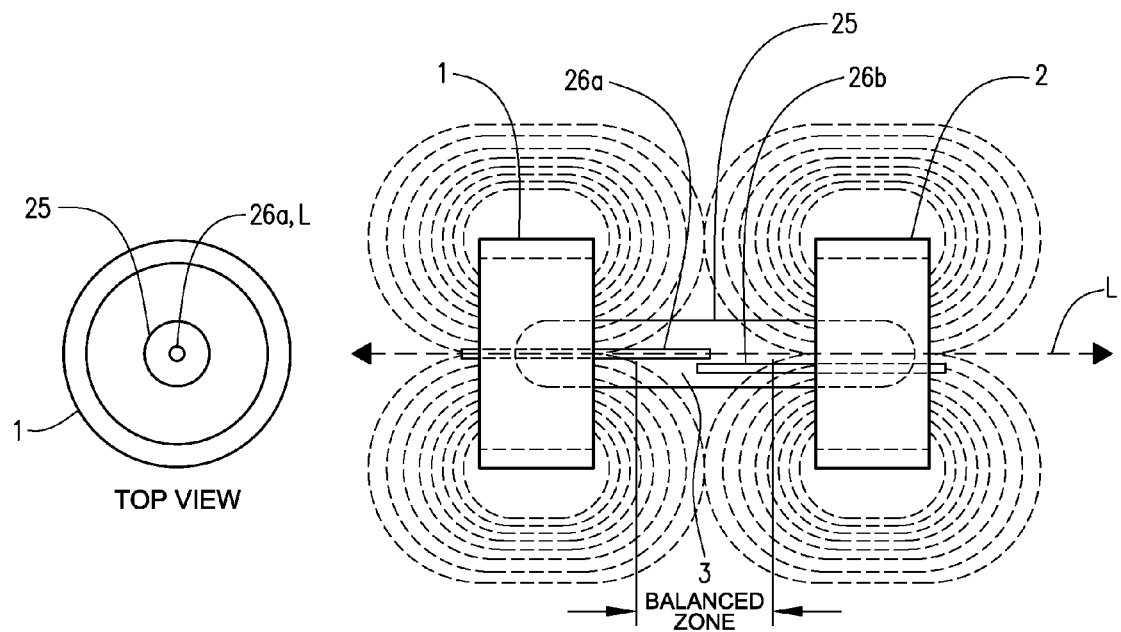
Figure 4B:
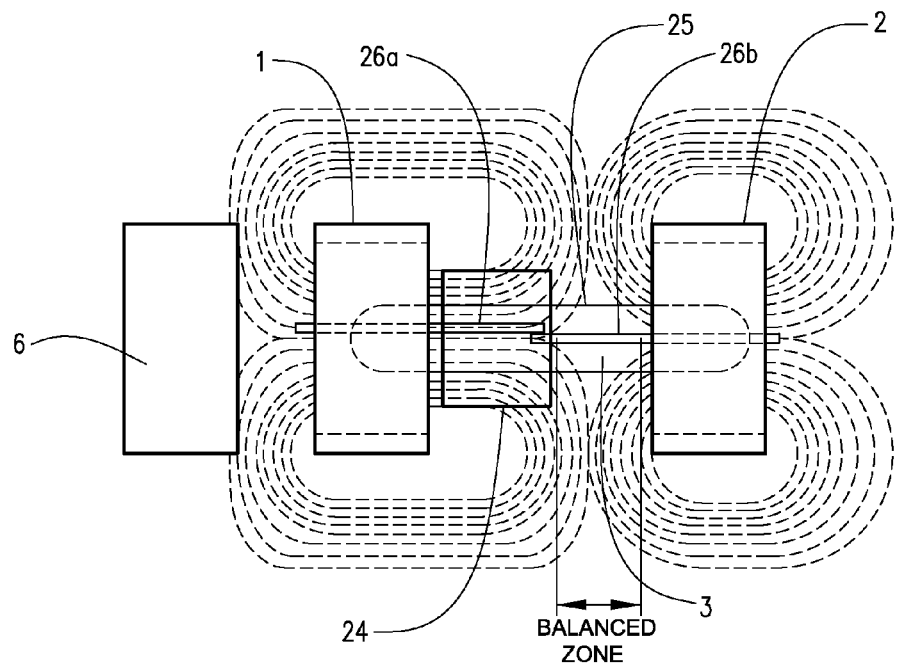

FIG. 4B illustrates sensor assembly 90 in reactive mode from the influence of target 6. As previously discussed, due to the approach of target 6, magnetic flux 7 of sensing magnet 1 is amplified and reaches further toward internal magnet 2, e.g. the area demarcated by box 24 in FIG. 4B as compared to FIG. 4A. The disturbance to balanced zone 3 effectively pushes or causes balanced zone 3 to shift toward internal magnet 2. Flux lines 7 become parallel flowing through sensing device 25 as shown in FIG. 4B. As a result, sensing device 25 transitions from its first state to a second state upon detection of a disturbance to balanced zone 3. As shown, the disturbance causes balanced zone 3 to shift a sufficient amount to be detectable by sensing device 25. In the depicted sensing device 25, reed switch becomes active and reed elements 26a and 26b are attracted to each other and result in closure of the contacts as shown.

Withdrawal of or the removal of target 6 from sensing area 4 results in rebalancing of the internal magnetic field over sensing device 25, i.e. a shift of balanced zone 3 back to its initial position depicted in FIG. 4A, thus causing sensing device 25 to return to its first state. For the illustrated sensing device, the first state is inactive, i.e. reed contacts open.

Figure 5A:
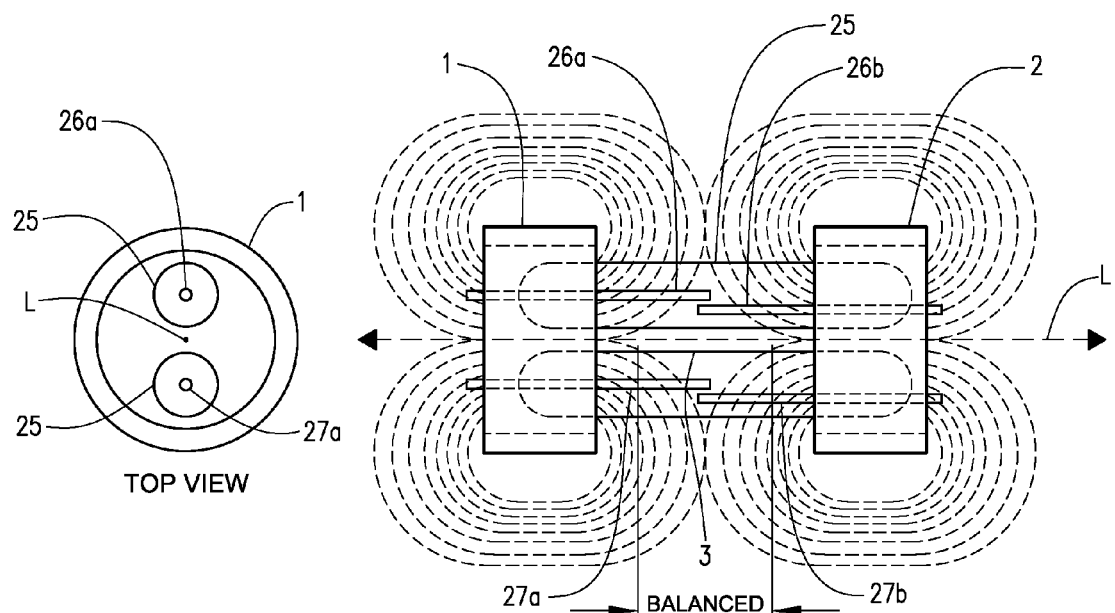
Figure 5B:
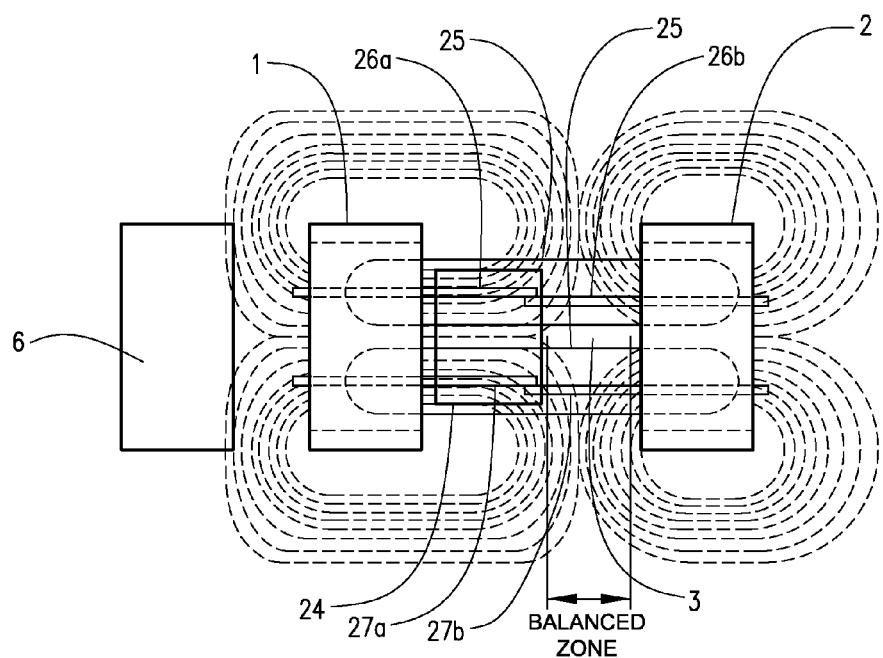
Figure 6A:
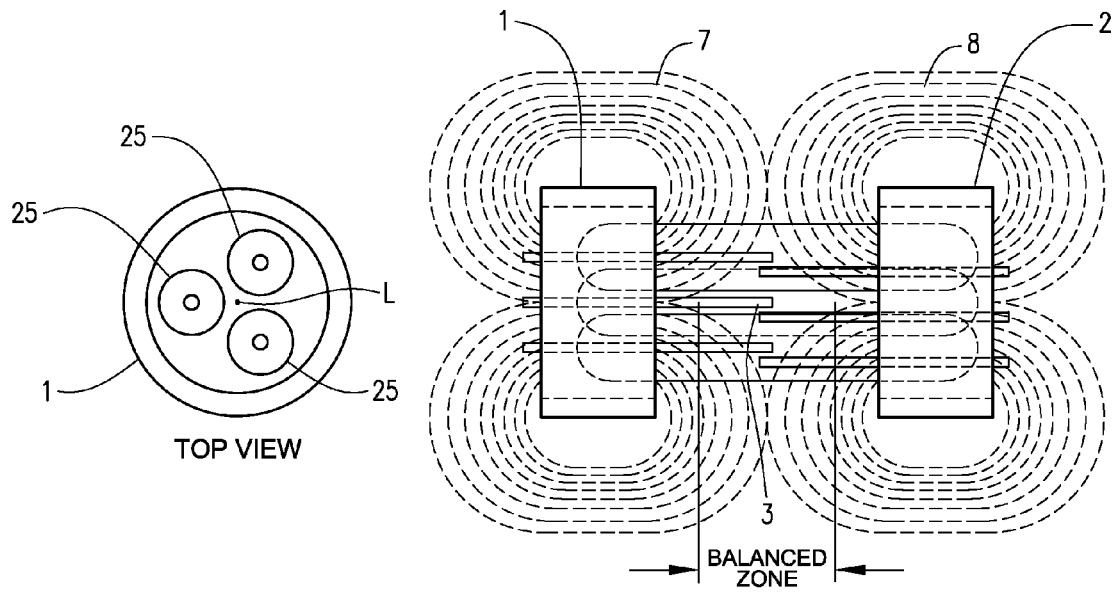
Figure 6B:
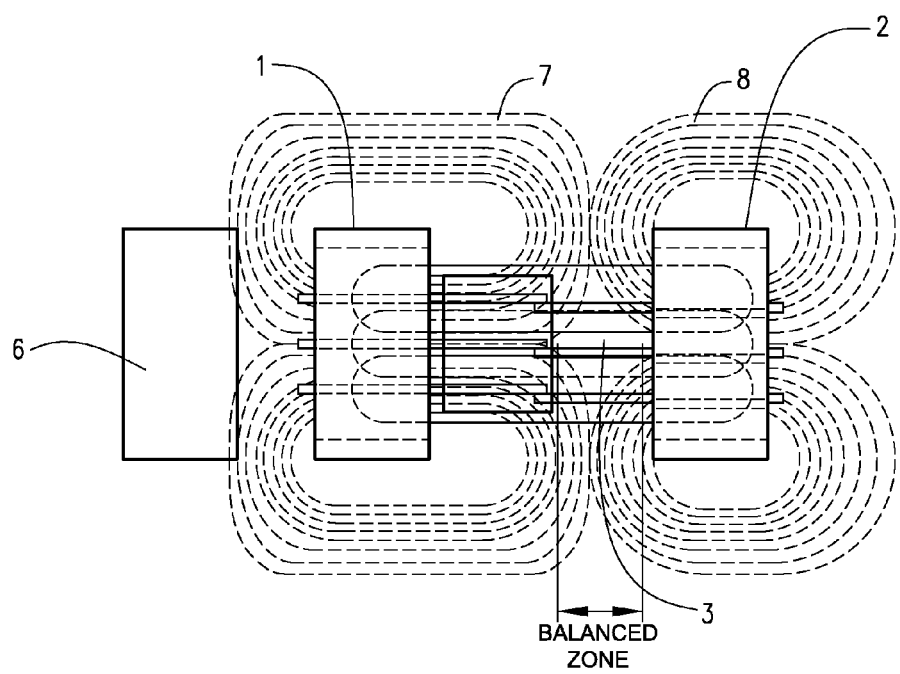

FIGS. 5A and 6A and 5B and 6B are similar to the description regarding FIGS. 4A and 4B. FIGS. 5A and 5B depict a simplified sensor assembly 90 with two sensing devices positioned in balanced zone 3 and FIGS. 6A and 6B depict a simplified sensor assembly 90 with three sensing devices 25.

It should be appreciated that sensor assembly 90 may include magnets 1 and 2 of similar sizes or different sizes and smaller or larger sensing devices 25 to incorporate more independent signals. Magnets 1 and 2 maybe increased in size to accommodate sensing devices 25 of similar size to aforementioned reed switches to maintain signal capability (electrical capability) of larger switches.

The above examples with reference to the figures illustrate sensing device 25 positioned in balanced zone 3 in a first state. If the first state is inactive, sensing device 25 is configured to go active when target 6 approaches sensor assembly 90 and causes a sufficient shift of balanced zone 3. It should be appreciated that sensing device 25 may be positioned outside balanced zone 3 in a first state. For example, in this configuration the sensing device's first state may be an active state and the sensing device is configured to transition to a second state, i.e. inactive, when target 6 approaches sensor assembly 90 and causes a detectable sufficient shift of balanced zone 3. For example, sensor assembly 90 may include a combination of sensing devices 25, e.g. active in its initial state and inactive in its initial state, simultaneously and that not all sensing devices 25 are required to be positioned within balanced zone 3. As a result, the need for additional components, such as an inverter is eliminated.

As shown in the figures, sensor assembly includes at least one sensing device 25. Suitable sensing devices include magnetic sensing devices, for example, reed switches, Hall sensors, or other gauss measuring devices, including devices for electronic signals. For example, magnetic sensing device 25 may be triggered by the approach (or departure) of a target 6, where the target includes a ferrous or permeable material (e.g. magnet, metal, or other material having magnetic permeable characteristics) therein causing a disturbance or shift of the balanced zone that is detectable by sensing device 25.

Sensing device 25 may be positioned within the balanced zone or may be positioned outside the balanced zone. For sensor assemblies 90 including more than one sensing device 25, some sensing devices 25 may be positioned within the balanced zone, outside the balanced zone, or combinations thereof.

Sensing device 25 will be positioned and oriented with respect to balanced zone 3 between sensing magnet 1 and internal magnet 2 such that flux lines trigger sensing device 25 in accordance with the sensing device's operating parameters. For example, if sensing device 25 is triggered when flux is parallel, then sensing device will be oriented appropriately; similarly if sensing device is triggered when flux is perpendicular to sensing device, then sensing device will be oriented appropriately between magnets 1 and 2 such that a detectable disturbance to balance zone 3 causes sensing device 25 to function in accordance with its operating parameters.

Sensing device 25 may be fixed to, housed by, positioned within, or carried by insert 60. One or more sensing devices of the same or different types may be used within sensor assembly 90. For example, a reed switch and a Hall sensor may be used simultaneously in sensor assembly 90. By way of further example, a single pole single throw (SPST) and/or single pole double throw (SPDT) type sensing devices may be used simultaneously in sensor assembly 90.

Referring to FIG. 7, sensor assembly 90 includes two sensing devices 25. FIG. 7 is illustrative of the influence target 6, when target 6 is a magnet. Sensor assembly 90 will respond in the same manner as described with respect to FIGS. 4A-6B.

For example, when target 6 is a magnet, and the polarity of target 6 facing sensor assembly 90 is opposite of the polarity of the end of sensor assembly 90 (e.g. target 6 polarity is north and the outer surface of sensing magnet 1 is south), the operational distance or sensing area 4 of sensor assembly 90 is much greater than that compared when target 6 is not a magnet and has ferrous or permeable magnetic material therein.

In some applications, when increased sensing distance or operational distance is desired, sensor assembly 90 may be used in conjunction with an actuator, e.g. another component, such as a permanent magnet like that depicted in FIG. 7. As a result, a ferrous unmagnetized permeable material (not depicted) may approach the magnet (labeled as 6 in FIG. 7), which will cause a shift in its magnetic field, which in turn affects the magnetic field within sensor assembly 90. Thus, in applications requiring greater separation between sensor 90 and the target, e.g. item to be sensed (not depicted), the sensor assembly 90 can be operated with a magnet actuator to achieve superior trigger point than to sensing applications where the magnet is not used.

FIG. 8 is an exploded perspective view of a portion of a sensor assembly 90 showing magnets 1 and 2 and insert 60 with shoulder 65. In this figure, insert 60 is configured to receive a single sensing device 25.

Figure 9:
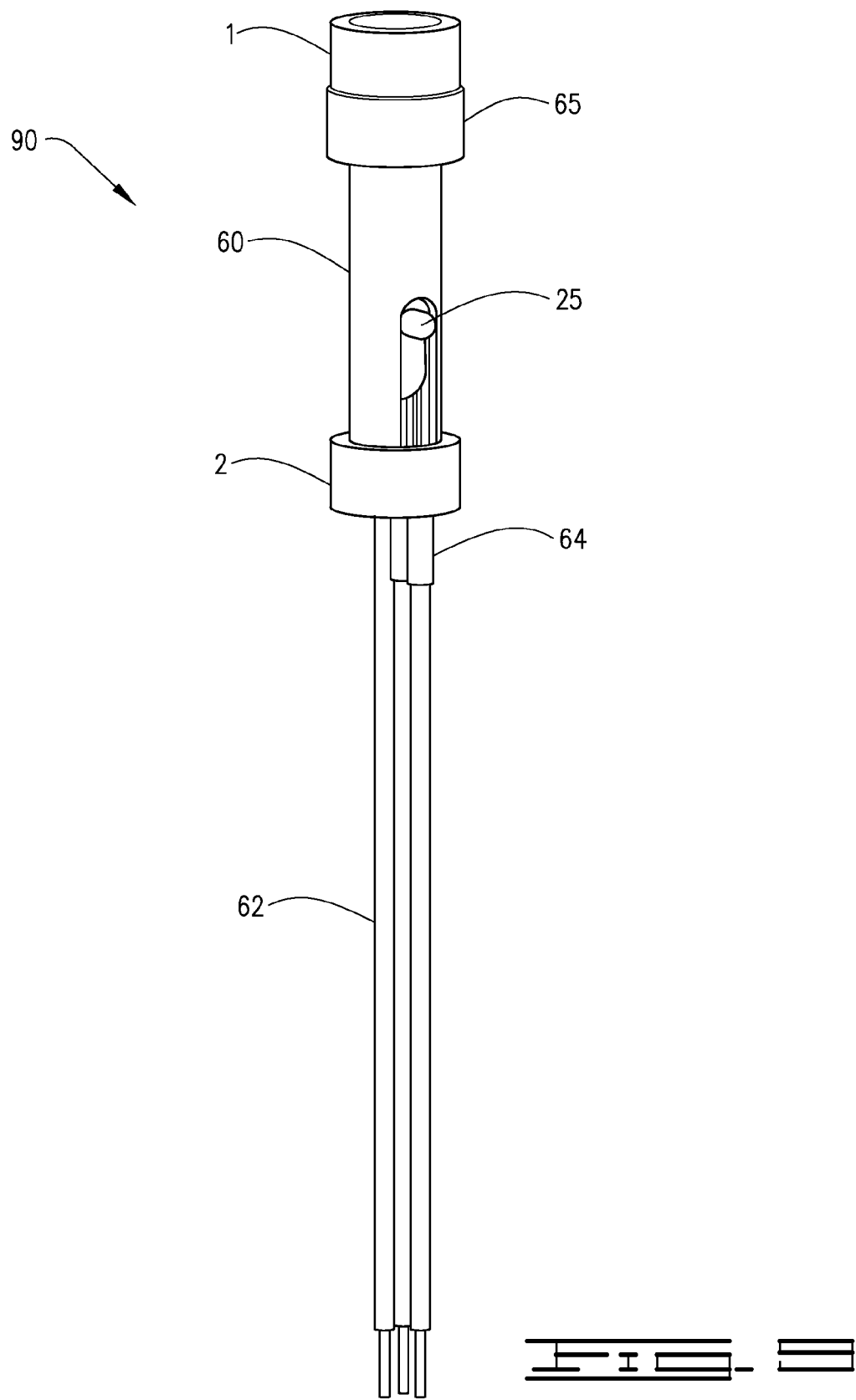
FIG. 9 depicts an assembled sensor assembly using the depicted portion shown in FIG. 8.

FIG. 9 is illustrative of an assembled sensor assembly using the depicted portion shown in FIG. 8. FIG. 9 includes magnets 1 and 2, insert 60, sensing device 25, wires 62 operably coupled to sensing device 25, and tabs 61.

Figure 10:
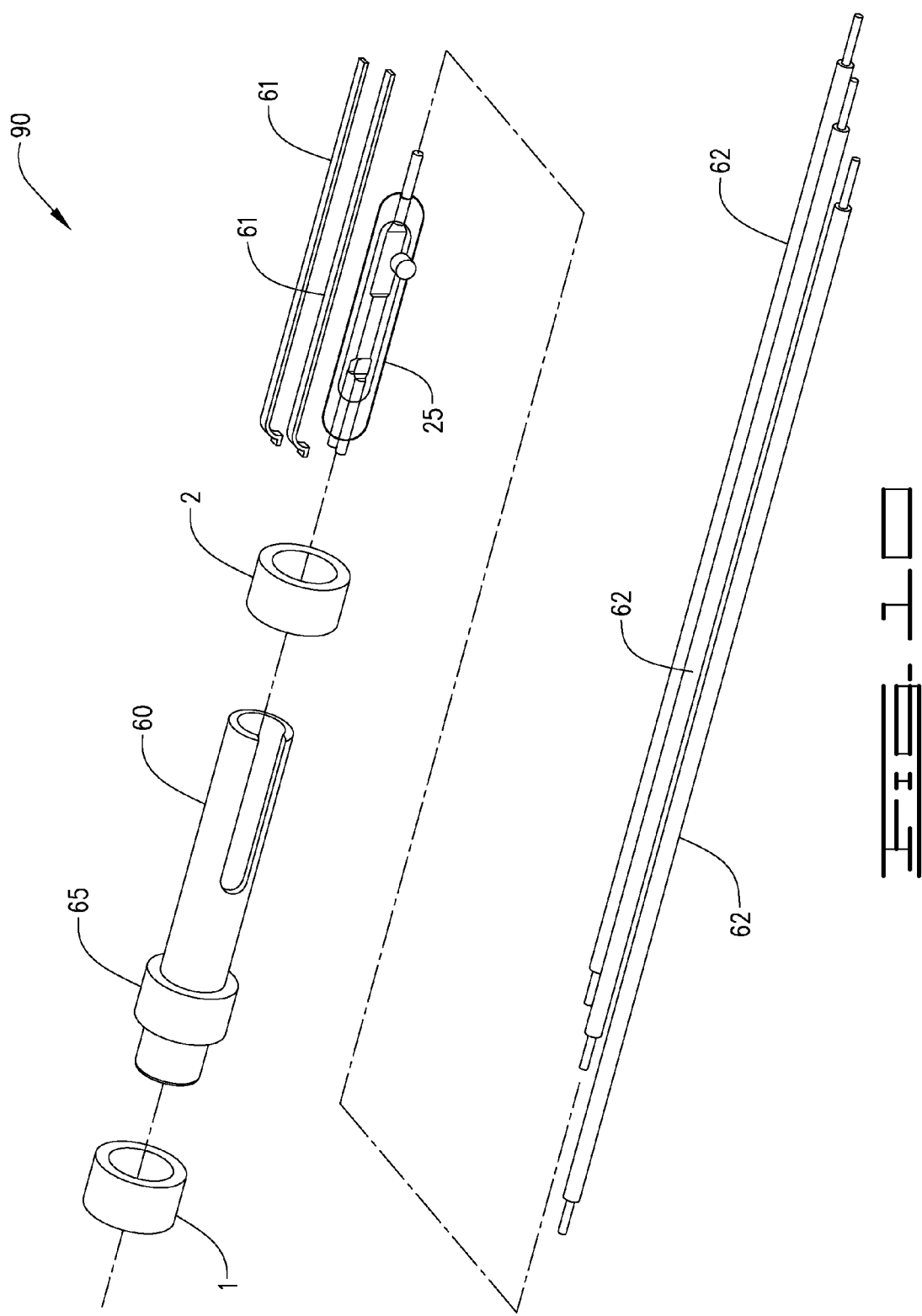
FIG. 10 is an exploded perspective view of the sensor assembly shown in FIG. 9.

FIG. 10 is an exploded perspective view of sensor assembly 90 shown in FIG. 9.

FIG. 11 is an exploded perspective view of another embodiment of a portion of a sensor assembly 90 depicting magnets 1 and 2 and insert 60 with shoulder 65. Insert 60 is configured to receive at least two sensing devices 25.

FIG. 12 is illustrative of an assembled sensor assembly 90 of the portion depicted in FIG. 11. FIG. 12 includes magnets 1 and 2, insert 60, sensing devices 25, tabs 61, wires 62 operably coupled to sensing devices 25, e.g. three wires 62 per sensing device 25, and sleeves 64.

FIG. 13 is an exploded perspective view of sensor assembly 90 shown in FIG. 12.

FIG. 14 depicts the sensor assembly of FIG. 12 showing a non-magnetic moveable retainer 70 for protection of the one or more sensing devices 25 positioned within the insert 60. It should be appreciated that retainer 70 is optional depending on the environment or application in which sensing device 25 is used.

FIGS. 15A-16D depict various views and cross-sections of the sensor assemblies depicted in FIGS. 9 and 12.

Various examples of non-magnetic insert 60 is shown in FIGS. 8 and 11. Insert 60 may be any shape including cylindrically-shaped or a rectangular box, or any shape suitable for achieving the described functions and orientations of the components of sensor assembly 90. Insert 60 may include cavities or grooves for placement of or receipt of one or more sensing devices 25 therein. Insert 60 may be configured to carry one or more magnets or provide a surface for securing a magnet thereto. Magnets 1 and 2 may be secured to insert 60 in any manner known in the art, including but not limited to, weld, epoxy, glue, mechanical devices, threaded, or slideably positioned on insert 60, and combinations thereof.

Insert 60 may optionally include a shoulder 65, depicted in FIGS. 8-16D, to serve as a stop or placement guide for a magnet secured to or positioned on insert 60.

Insert 60 may optionally include a retaining member 70, depicted in FIG. 14, which is coaxial with magnets 1 and 2. Retaining member 70 helps to retain the one or more sensing devices 25 within insert 60 and protect the sensing device 25. Retaining member 70 may be slideably positioned onto insert 60 and may be free to move along and around the periphery of insert 60 or may be secured in place on insert 60.

The sensor assembly 90 may also include a housing, not depicted in the figures. Sensor assembly 90 may be placed in a housing such that the housing does not interfere with the sensor assembly's function and operation described herein. The housing may be any suitable shape for retaining sensor assembly 90 therein and allowing for the connectivity of wires to operably connect with sensor assembly 90. For example the housing may be cylindrically shaped or a rectangular-boxed shaped, or housing may be an adjustable bolt type housing.

Sensor assembly 90 may further include wires 62, depicted in FIGS. 9, 10, and 12-16D, attached to sensing device 25 and operably connected to other electronics or components for communicating electricity, or a change in signal caused by actuation of sensing device 25. For example, when sensor assembly 90 includes ring magnets, wires 62 may pass through the opening defined by the ring of internal magnet 2 and connect to sensing device 25 and thereby allow for the sensor assembly to have a smaller, compact footprint.

As shown in FIGS. 10 and 13, sensor assembly 90 may also include tabs 61. Tabs 61 may be optional wires for facilitating electrical connection with the sensing device. Tabs 61 need to be of sufficient size to carry the electrical signal rating of sensing device 25. For example, tabs 61 provide a convenient means to connect to the far end of the sensing device, maintain a relatively small overall diameter of the sensor assembly, and connect to the relatively larger diameter insulated wires 62 at the end of the sensor assembly. For example, tabs 61 may be made of nickel, copper, or any non-ferrous or low-ferrous material that does not affect the overall function of the sensor assembly 90 with respect to sensing a magnetic field. Tabs 61 may be connected by any means known in the art, including but not limited to welding, soldering.

Sensor assembly 90 may also include sleeve 64, depicted in FIGS. 9, 12, and 13-15C. Sleeve 64 is an optional insulator, for example, heat shrink tubing, electrical tape, or any other electrically rated insulating material known in the art. Sleeve 64 prevents the wires coupled to sensing device from shorting each other out by providing voltage isolation between all connections.

The present described apparatus and end uses are not limited to the above examples and descriptions. Other embodiments will be apparent to one skilled in the art. As such, the foregoing description merely enables and describes the general uses and methods of the described apparatus. While certain embodiments of the apparatus have been described for the purpose of this disclosure, those skilled in the art can make changes without departing from the spirit and scope thereof. The scope is to be determined by reference to the appended claims.

What is claimed is:

1. A sensor assembly comprising:
   a non-magnetic insert having a first end, a second end, and a longitudinal axis;
   a sensing magnet, the sensing magnet is an axially-magnetized ring magnet, wherein the sensing magnet is carried by the first end of the non-magnetic insert;
   an internal magnet, the internal magnet is an axially-magnetized ring magnet spaced apart from and coaxial with the sensing magnet and carried by the second end of the non-magnetic insert, and the sensing magnet and internal magnet are oriented to each other with like-poles facing one another;
   a moveable balanced zone between the magnets defined by magnetic fields emanating from each of the sensing magnet and the internal magnet, the moveable balanced zone positioned between the two magnets where the magnetic fields of each magnet are in balance with each other, wherein the balanced zone shifts in response to the proximity of a target; and
   a sensing device in a first state, the sensing device is positioned between the sensing magnet and the internal magnet, wherein the sensing device is configured to transition from the first state to a second state upon detection of a disturbance to the balanced zone, wherein such disturbance causes the balanced zone to shift a sufficient amount to be detectable by the sensing device.

2. The sensor assembly of claim 1, wherein the target includes a magnetic, permeable, and/or ferrous material which is capable of causing the disturbance to the balanced zone upon the approach or withdrawal of the target to the sensor assembly.

3. The sensor assembly of claim 1, wherein the sensing magnet defines a sensing area centered around the longitudinal axis and extending away from the sensing magnet and the internal magnet, and wherein upon the approach or departure of the target in the sensing area disturbs the balanced zone by causing the balanced zone to shift.

4. The sensor assembly of claim 1, wherein the sensing device is positioned within the balanced zone.

5. The sensor assembly of claim 1, wherein the sensing device is positioned outside the balanced zone.

6. The sensor assembly of claim 1, wherein the sensing device is a reed switch.

7. The sensor assembly of claim 1, wherein the sensing device is one or more of the following: a reed switch, a Hall-effect sensor, or combinations thereof.

8. The sensor assembly of claim 1, wherein the sensing device is housed within the non-magnetic insert.

9. The sensor assembly of claim 1, wherein the sensing magnet and internal magnet are similar in one or more of the following: composition, size, and magnetic strength.

10. The sensor assembly of claim 1, wherein the sensing magnet and internal magnet are different in one or more of the following: composition, size, and magnetic strength.

11. The sensor assembly of claim 1, further comprising a non-magnetic retaining member positioned on the insert between the sensing magnet and internal magnet and coaxial with the sensing magnet and internal magnet.

12. The sensor assembly of claim 1, wherein the sensor assembly is end-sensing.

13. An end-sensing sensor assembly comprising:
    two axially-magnetized ring magnets; a non-magnetic insert having a longitudinal axis; and a sensing device; wherein the non-magnetic insert is positioned between the two axially-magnetized ring magnets, the axially-magnetized ring magnets are coaxial and oriented with like poles facing one another such that resulting magnetic flux lines emanating from the two axially-magnetized ring magnets define a moveable balanced zone therebetween, wherein the balanced zone shifts in response to the proximity of a target, and the sensing device in a first state is carried within the non-magnetic insert, wherein the sensing device is configured to transition from the first state to a second state upon detection of a disturbance to the balanced zone, wherein such disturbance causes the balanced zone to shift a sufficient amount to be detectable by the sensing device.

14. The end-sensing sensor assembly of claim 13, wherein the sensing device is positioned in the balanced zone.

15. The end-sensing sensor assembly of claim 13, wherein the sensing device is positioned outside the balanced zone.

16. The end-sensing sensor assembly of claim 13, wherein the approach or departure of the target near the longitudinal axis and an outer surface of one of the axially-magnetized ring magnet disturbs the balanced zone by causing the balanced zone to shift, wherein the outer surface of one of the axially-magnetized ring magnets is the pole of the magnet not facing toward the other axially-magnetized ring magnet.

17. The sensor assembly of claim 13, wherein the target includes a magnetic, permeable, and/or ferrous material.

18. A sensor assembly comprising:
    a non-magnetic insert having a longitudinal axis, the non-magnetic insert is positioned between two axially-magnetized ring magnets, the two magnets are coaxial and oriented with each other with like poles facing one another such that the magnetic flux emanating from each of the magnets define a moveable balanced zone therebetween where each magnet does not exert a force on the other magnet, wherein the balanced zone shifts in response to the proximity of a target, wherein the target includes a magnetic, permeable, and/or ferrous material; and
    a magnetic sensing device configured to detect a disturbance in a magnetic flux, the magnetic sensing device positioned between the axially-magnetized magnets and carried by the non-magnetic insert,
    wherein upon the approach or departure of the target near the longitudinal axis and an outer surface of one of the axially-magnetized ring magnets disturbs the balanced zone by causing the balanced zone to shift.

19. The sensor assembly of claim 18, wherein the sensor assembly is end-sensing.

20. The sensor assembly of claim 18, wherein the outer surface of one of the axially-magnetized ring magnets is the pole of the magnet not facing toward the other axially-magnetized ring magnet.

* * * * *